(12) United States Patent
Middelkamp et al.

(10) Patent No.: US 10,460,384 B2
(45) Date of Patent: Oct. 29, 2019

(54) AUTOMATED RISK MONITORING METHOD AND SYSTEM

(71) Applicant: SWISS REINSURANCE COMPANY LTD., Zurich (CH)

(72) Inventors: Peter Middelkamp, Einsiedeln (CH); Lutz Wilhelmy, Pfaffikon (CH)

(73) Assignee: SWISS REINSURANCE COMPANY LTD., Zurich (CH)

( * ) Notice: Subject to any disclaimer, the term of this patent is extended or adjusted under 35 U.S.C. 154(b) by 353 days.

(21) Appl. No.: 14/293,830

(22) Filed: Jun. 2, 2014

(65) Prior Publication Data
US 2014/0279406 A1 Sep. 18, 2014

Related U.S. Application Data

(63) Continuation of application No. 11/817,121, filed as application No. PCT/EP2005/050787 on Feb. 24, 2005.

(51) Int. Cl.
*G06Q 40/00* (2012.01)
*G06Q 40/02* (2012.01)
(Continued)

(52) U.S. Cl.
CPC ........... *G06Q 40/025* (2013.01); *G06Q 40/06* (2013.01); *G06Q 40/08* (2013.01)

(58) Field of Classification Search
CPC .............................. G06Q 40/00; G06Q 40/08
See application file for complete search history.

(56) References Cited

U.S. PATENT DOCUMENTS

| 6,078,903 A * | 6/2000 | Kealhofer .............. G06Q 40/02 705/36 R |
| 7,778,897 B1 | 8/2010 | Rachev et al. |

(Continued)

FOREIGN PATENT DOCUMENTS

| WO | WO 02/101500 | 12/2002 |
| WO | WO 2005/010784 | 2/2005 |

OTHER PUBLICATIONS

Elsinger, Helmut (Risk Assessment for Banking Systems, FDIC Conference, https://www.fdic.gov/news/conferences/finance_banking/Elsinger.pdf, Mar. 2004) (Year: 2004).*

(Continued)

*Primary Examiner* — Bruce I Ebersman
*Assistant Examiner* — Mark H Gaw
(74) *Attorney, Agent, or Firm* — Oblon, McClelland, Maier & Neustadt, L.L.P.

(57) ABSTRACT

The invention relates to an automated risk monitoring method and a corresponding risk monitoring system for automated risk monitoring, in the case of which control data for different companies are transferred to a monitoring unit and evaluated, a company specific asset distribution and a corresponding threshold value being determined, said threshold value corresponding to the expected value of the asset parameter for the occurrence of the insolvency of a company, recovery rate factors being determined by means of a standardization module of the monitoring unit, and wherein, using a MonteCarlo module of the monitoring unit (20), MonteCarlo asset parameters are generated for each company by means of which the companies with the lowest expected recovery rate factors are determined and dynamic adjustment of the portfolio accordingly made by means of the monitoring unit.

9 Claims, 1 Drawing Sheet

(51) Int. Cl.
*G06Q 40/06* (2012.01)
*G06Q 40/08* (2012.01)

(56) References Cited

U.S. PATENT DOCUMENTS

| | | | | |
|---|---|---|---|---|
| 7,996,296 B2* | 8/2011 | Lange | ................... | G06Q 30/08 705/37 |
| 2002/0123960 A1* | 9/2002 | Ericksen | ................ | G06Q 40/00 705/38 |
| 2003/0093347 A1* | 5/2003 | Gray | ...................... | G06Q 40/00 705/35 |
| 2003/0139993 A1 | 7/2003 | Feuerverger | | |
| 2003/0172017 A1* | 9/2003 | Feingold | ................ | G06Q 40/00 705/35 |
| 2004/0143528 A1* | 7/2004 | Spieler | .................. | G06Q 20/10 705/35 |
| 2004/0210500 A1* | 10/2004 | Sobel | .................... | G06Q 40/00 705/35 |
| 2004/0254806 A1* | 12/2004 | Schwerin-Wenzel | ........................ | G06Q 10/10 705/36 R |

OTHER PUBLICATIONS

International Search Report dated Jul. 4, 2005, in Application No. PCT/EP2005/050787.
GedaeBenmark.pdf (http://ww.gedaie.com/documents/MCBS%20Gedaie%20Benchmark.pdf).
Altman et al., "Default Recovery Rates in Credit Risk Modeling: A Review of the Literature and Empirical Evidence" (http://people.stern.nyu.edu/ealtman/Review1.pdf).

\* cited by examiner

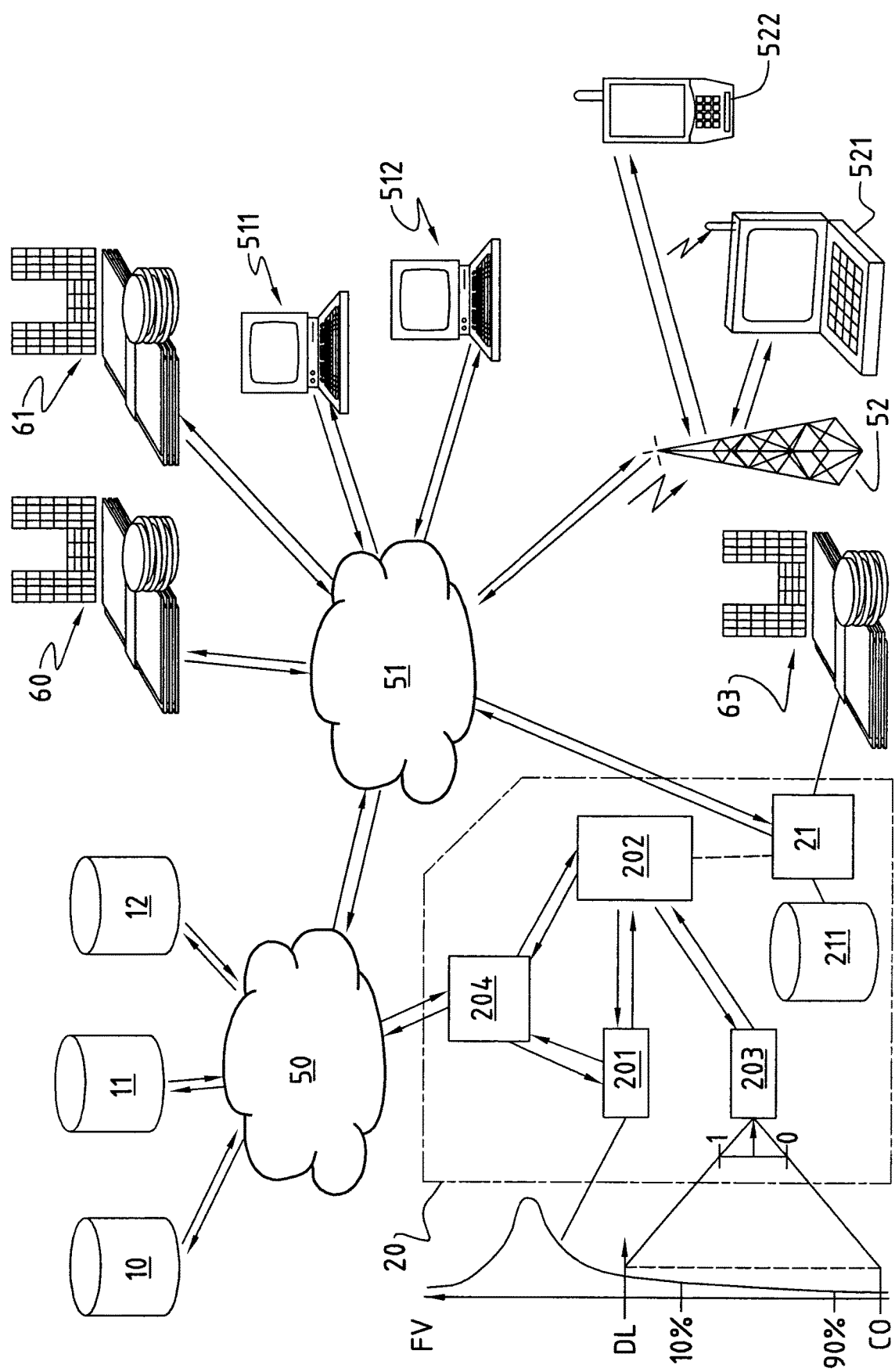

AUTOMATED RISK MONITORING METHOD AND SYSTEM

CROSS-REFERENCE TO RELATED APPLICATIONS

The present application is a continuation application of and claims the benefit of priority under 35 U.S.C. § 120 from U.S. application Ser. No. 11/817,121, filed Sep. 5, 2008, which is a national stage of and claims priority under 35 U.S.C. § 365, to Patent Cooperation Treaty Application No. PCT/EP2005/050787, entitled: Automated Risk Monitoring Method and System, filed on Feb. 24, 2005, the entire contents of each of which is incorporated herein by reference.

TECHNICAL DOMAIN

The invention relates to an automated monitoring method and a risk monitoring system for automated credit monitoring of a portfolio, wherein corporate data for different companies are transferred to a monitoring unit for evaluation. The invention relates, in particular, to a risk monitoring system in which the anticipated recovery rate factors for each company are determined and these companies are then displayed by means of the monitoring unit via an output and/or dynamically adjusted accordingly in the portfolio, the financial data being transmitted via a network to at least one financial institution.

STATE OF THE ART

After a credit or financial contract has been signed between two or more parties, situations may occur in which at least one of the parties is unable to discharge his contractual obligations. In that situation, a credit failure or default is said to have occurred. A default occurs, for example, if:

an interest or redemption payment is either not made at all or only belatedly;

an application to open insolvency proceedings is filed or debt titles are exchanged for a packet of securities with a lower value.

Banks and other financial institutions are particularly exposed to this credit risk, but so too are almost all other personal or institutional investors. To enable the impact of the credit risk to be assessed, most financial institutions and other investors therefore make systematic evaluations of credit customers and verify the credit risk carried by the loan for which an application has been made. For this purpose, they use various rating systems and credit risk modules which normally provide information on the quality or creditworthiness of a debtor to them at regular intervals. Such information then serves as the basis for comprehensive, statistically assured systems for risk assessment and risk control. Especially in the area of credit portfolio management, these systems play a very important role as the goal of optimum portfolio development can be achieved much better and much more easily in this way.

In previous practice, various modules were developed and are used as the basis of systems for credit portfolio management, their aim being to determine a probability distribution of the possible default losses. To enable the impact of the credit risk on the financial institution or investor to be estimated, these modules consider in particular the probability and timing of defaults on individual loans or credits.

The credit loss anticipated by banks for a particular credit is made up of the probability of default (PD) on the loan multiplied by the resulting loss or loss given default (LGD):

$$E(\text{Credit Loss}) = PD * LGD$$

In addition to the probability of default (PD) and the loss given default (LGD), the recovery rates are other main variables which influence the degree of credit risk. In the area of risk monitoring and risk quantification, and in particular in that of credit risk monitoring, recovery rates show the percentage share of a loan sum which will be repaid to the lender in the event of a default on the loan. The loss given default is generally stated as a percentage, equivalent to the percentage share of the nominal sum which will be lost after default on a credit. The recovery rate on the other hand is defined as the portion of the nominal sum which will still be repaid after the credit default.

The relationship between the recovery rate and the loss given default is therefore as follows:

$$\text{Recovery Rate} = 1 - LGD$$

At present in the existing credit risk modules, only the probability of default is generally modelled more accurately, while the loss given default is often indicated far less precisely. The recovery rate is either assumed to be constant (for instance 50% of the nominal amount) or else approximated by the historic average for different seniority classes.

However, this simplification leads to incorrect assessments of the credit risk and therefore also to false or imprecise valuations of credits and loans as the recovery rate is highly volatile and varies substantially as a function of time. What is more, the existing models assume that the default and recovery rate are independent of each other. However, there is an altogether negative correlation between these factors so that the recovery rates in times of high failure rates assume lower values and, in particular in the event of unfavorable developments, may therefore have further negative impacts on the credit loss. For these reasons, the recovery rates must be regarded as parameters dependent on the probability of default. In particular to enable a better capital allocation, more precise price determination and better portfolio management to be achieved, a great many other variables would have to be taken into account for determination of the recovery rate, e.g. the nature of the credit or the capital structure of the failed companies. For example, the recovery rate should also be a function of the asset values of the company.

In the risk management system disclosed in document WO 02/101500, in the first place trading and market data are processed, corresponding risk management reports compiled and at the same time transferred to a series of users of the system. The risk here is in each case trade-related and placed in a relationship with trading transactions between several trading businesses between multiple users who may or may not be connected. The disclosed system is used in principle to permit precise and simple assessment of possible risks on a derivatives market. However, the system does not disclose any determination of recovery rates and is therefore not suitable for automated credit risk monitoring of a portfolio.

Document US 2003/0172017 describes a method and the corresponding system for the performance of a "Value at Risk" (VaR) analysis on a large scale. Here the system comprises two different component types, the controllers to process the data and the brokers for access control to the corresponding data. Controllers extract the input data from the input queues, process such data and write the results into the corresponding output queues which serve as the input queue for the next following system component. Brokers are responsible for the availability of and access to the jointly used resources. Although this system represents a use of distributed resources and therefore permits a substantial improvement of traditional systems it does not provide a tool which would enable recovery rates to be determined precisely and automated credit risk monitoring of a portfolio performed.

DISCLOSURE OF THE INVENTION

One task of this invention is therefore to propose a new risk monitoring system and a new monitoring method for automated credit risk monitoring of a portfolio without the drawbacks of the state of the art referred to above. In particular, a system is to be proposed for the automated simple and rational credit risk monitoring to take account of the fact that the Loss Given Default (LGD) and hence the Recovery Rates are stochastic variables for every company. The invention will also make available a monitoring method in which the recovery rates of the individual companies are suitably determined and standardized to enable the most accurate possible credit risk determination, and hence optimized portfolio management, to be achieved. In addition, the invention is intended to produce a system and a method in which the monitored portfolios are automatically adapted and the appropriate financial data can be automatically notified to the relevant financial institutions.

According to the present invention, this goal is achieved, in particular, through the characteristics of the independent claims. Other advantageous forms of implementation likewise emerge from the dependent claims and the specification.

In particular, these aims are achieved by the invention in that corporate data for different companies are transferred to a monitoring unit and evaluated, one or more assets parameters being extracted for each company by means of an extraction module in a company-specific manner from the corporate data, while the asset parameters of the companies are evaluated stochastically by means of a statistical module in the monitoring unit in such a way that at least one company-specific asset distribution is determined and stored which, based on at least one company-specific asset distribution, determines the threshold value and is stored in a subordinated manner, the threshold value being equivalent to the expected value of one or more asset parameters for the occurrence of insolvency of a company; that by means of a standardization module for the monitoring unit based on the particular company-specific asset distribution and/or threshold value, recovery rate factors can be determined and standardized, the company-specific recovery rates factors being stored by means of a database in a subordinated manner to the corresponding asset distribution; that with the help of a MonteCarlo module in the monitoring unit, MonteCarlo asset parameters are generated for each company by means of which the companies are determined with the expected recovery rate factors; and that the companies are displayed with the expected recovery rate factors by means of the monitoring unit via an output and/or dynamically adjusted in the portfolio, financial data being transferred via a network to at least one financial institution. This implementation variant has the advantage that, on the basis of the company-specific asset distributions, the particular recovery rates are determined, standardized and stored for each company and that the companies are then sorted out and displayed with the relevant recovery rate, while portfolios can be dynamically adjusted. In addition, financial data may be transferred automatically via a network to one or more interested financial institutions without the need for human supervision or interaction. This enables portfolio management to be improved substantially in that the necessary adjustments can be made in real time and automatically.

In one implementation variant, the lowest expected recovery rate factors associated with the portfolio are stored on a database of the monitoring unit; the users benefit from controlled access to the recovery rate factors via a network and are able to adjust the portfolio accordingly. This implementation variant has the benefit that users are able to directly effect monitoring and adjustment of managed portfolios. A central database for the storage of recovery rate factors gives a good overview of the different values and permits more efficient adjustment of the managed portfolios.

In a further implementation variant, portfolio data comprising at least the lowest anticipated recovery rate factors are transmitted to at least one authorized broadcast transmitter and circulated by at least one broadcast transmitter in an encrypted and unidirectional manner. This implementation variant has the advantage, among others, that the portfolio data and, in particular, the lowest expected recovery rate factors which have been determined can be made accessible via the broadcast transmitter to a larger number of users. Potentially many users on an extremely large territory can therefore be supplied with the requisite data in this way. The encryption of the portfolio data which are transmitted guarantees that only users with access authorization can indeed make use of the transmitted portfolio data.

In yet another implementation variant, the system incorporates receiving devices to receive the access-controlled portfolio data by means of which access request data can be transferred to a conditional access server via a mobile telephone network and the access entitlement data can be transferred via the mobile telephone network by means of the conditional access server based on the access request data to the relevant receiving device, the access-controlled portfolio management data being received by the receiving devices and the encryption removed by means of the access authorization data. This implementation variant has the further advantage that the users' access entitlements are managed by a centralized authentication and authorization agency. This enables efficient access control to be guaranteed so that portfolio management data can only be used by persons having access authorization. In addition, in this implementation variant the receiving devices can remain simple as the access authorization functions do not have to be implemented on the receiver device.

In another implementation variant, the risk monitoring system comprises one or more transaction servers to handle billing data received via the mobile telephone network, said billing data comprising information about the service required with the receipt of the portfolio management data. This implementation variant has the advantage that the services linked to the transmission and receiving of portfolio management data are also billed centrally by a transaction server and invoiced to the users. This enables an efficient billing system to be set up in which the users simply pay for the services used by them in each particular case.

In another implementation variant, the receiving devices have receiving means to receive several DB channels. This implementation variant has the further advantage that, in particular, digital broadcasting systems can be used to disseminate portfolio management data. The use of more than one DB channel enables data to be sorted by type and/or origin and/or intended receivers.

In yet another implementation variant, the receiving devices have configurable filters to extract relevant portfolio data for a specific portfolio from the DB data stream and/or to display and/or store relevant portfolio data for a specific portfolio. This implementation variant offers, as one of its advantages, the possibility of separating, in the receiving device, the received data by means of configurable filters into relevant portfolio data and irrelevant accompanying data. Thanks to the configurability of the filters, the nature, scope, number or quantity of relevant portfolio data can be adjusted individually for each user and configured according to his particular needs.

In a further implementation variant, appropriate securities can be bought and sold via a financial institution by means of the receiving device on the basis of the portfolio data in the course of portfolio management. This implementation variant offers as one of its advantages the possibility of achieving further optimization of portfolio management in that the calculated recovery rate factors and the relevant MonteCarlo asset parameters are used to determine in a dynamic manner the securities which are to be bought or sold and to enable the particular transaction to be performed directly via a link to the financial institution.

In another implementation variant, the receiving devices have filters to extract portfolio data, corresponding portfolio management applets and/or URLs or other addresses to load relevant portfolio management applets from the DB data stream of the broadcast transmitter. This offers the advantage that such portfolio management applets or URLs can be broadcast without encryption, for example as program-accompanying data, together with the data stream of the broadcast transmitter, while the user gains easy access to such data via the receiving device.

In yet another implementation variant, the receiving devices contain in each case a cost calculation module by means of which the billing data can be transferred at least partially at regular intervals, during and/or after access to the access-controlled portfolio management data, from the receiving device to the transaction server. This implementation variant has the further benefit that the costs arising from the services on offer can be billed automatically and directly to the users.

SHORT DESCRIPTION OF THE DRAWING

The implementation variants of the present invention are described below on the basis of examples. The examples of implementation are illustrated by the following attached figure:

FIG. 1 is a block diagram which illustrates the system in accordance with the invention in schematic form.

FORMS OF IMPLEMENTATION OF THE INVENTION

FIG. 1 shows in schematic form an architecture which can be used to implement the invention. In this example of implementation, the reference numbers 10, 11 and 12 refer to databases containing company-specific data. These company-specific data comprise, in particular, controlling data which may be used to assess the credit risk of any company, for example external data such as the size of the company, the time since its foundation, activity branch, number of employees and also internal data such as the balance sheet, cash flow, credit liabilities and any other kind of relevant data. These company-specific control data can be updated actively at regular intervals and also made available by means of a suitable mechanism in real time.

The company-specific control data are transferred as shown in FIG. 1 via a communication network 50 to a monitoring unit 20. The communication network 50 comprises for example a GSM or UMTS network or a satellite-based mobile telephone network and/or one or more fixed networks, for example the Public Switched Telephone Network (PSTN), the Internet and WWW (World Wide Web) or a suitable LAN (Local Area Network) or WAN (Wide Area Network). In particular, it also comprises ISDN and XDSL connections. In FIG. 1, the reference number 51 likewise refers to a communication network and reference numbers 60, 61 and 63 to financial and/or banking institutions. The communication network 51 may, in particular, be of the same type as the communication network 50 or alternatively of a different type and linked to communication network 50 by means of suitable protocols and transmission devices. The term "Financial and/or Banking Institutions" 60, 61 and 63 refers, in particular, to banks but also to other investment and/or financial establishments. In particular, the financial and/or banking institutions 60, 61 and 63 may also be companies which are active in online banking or companies which offer services for online buying and selling of securities.

The monitoring unit 20 comprises an extraction module 204 by means of which one or more asset parameters can be extracted from the control data for the companies concerned. These assets parameters may comprise all the asset parameters which are used for the valuation of a business. In addition, the monitoring unit 20 comprises a statistical module 201 by means of which asset parameters, which are extracted from the extraction module 204, can be stochastically evaluated and the corresponding company-specific asset distribution then stored. The statistical module 201 can use various current or innovative models and algorithms for the stochastic evaluation of the asset parameters and to determine the company-specific asset distribution.

The monitoring unit 20 additionally comprises a storage module 211 for the determination and associated storage of a threshold value based on at least one company-specific asset distribution. This threshold value corresponds in each case to the expected value of one or more asset parameters. The monitoring unit 20 also comprises a standardization factor 203 to determine and standardize the recovery rate factors based on the particular company-specific asset distribution and/or on a threshold value determined in advance. The aggregated distribution of the loss given default determined from the individual risks and hence the corresponding recovery rate factors can be determined in a variety of ways. When considering the probability distribution of possible credit default losses, a distinction is normally made between the expected loss—EL and the unexpected loss—UL. Additionally the default losses L are defined, corresponding as a rule to the sum of the expected and unexpected losses. The expectation value EL corresponds to the statistical mean value of the default losses and can be estimated readily by a variant of the elementary Tschebyscheff inequation:

$$P(\tilde{L} \geq EL + UL) \leq \frac{EL}{EL + UL}$$

The Tschebyscheff inequation is a very general approach which does not take account of any assumptions as to the fundamental probability distribution. In particular, no assumptions are made as to possible diversification effects. However, the result corresponds in every case to a valid upper limit for the insolvency probability. Nevertheless, the actual risks are considerably overestimated in this determination.

Other possibilities for the determination of the recovery rate factors are known from structural models. In those models the default of a company is triggered by a process of asset value change for the company concerned. The risk of default therefore depends to some extent on the variance of the company value. Failure or default occurs if the asset V at the time of debt repayment T is less than the liabilities X of the company. The outpayment function is therefore the lower of the nominal amount of the liabilities and of the asset values:

$$\min\{X, V\}$$

From this basic equation, an explicit formula can then be derived to calculate the probability of failure of loans which carry a default risk. This can also be used to calculate the spread between risk-free and risky loans.

The credit risk components (default probability and recovery rate) both depend in this model on the volatility of the company value and its debt level or leverage. The two components are frequently also subdivided into business risk and financial risk. The recovery rate is therefore an endogenous variable and depends upon the residual value of the company. In addition, the probability of default and the recovery rate are negatively correlated.

This relationship between the default probability and recovery rate can be investigated more accurately by means of the following determination. We may assume that the assets of a company follow a geometrical Brownian movement:

$$dV = \mu V dt + \sigma V dB_t$$

in which $\mu$ is the drift coefficient, $\sigma$ the volatility of the company value and $B_t$ a standard Brownian movement. It follows that the logarithm described in the assets at time t $$\log V_t = \log V_0 + \left(\mu - \frac{\sigma^2}{2}\right)t + \sigma B_t$$

has a normal distribution with a mean value $$\log V_0 + \left(\mu - \frac{\sigma^2}{2}\right)t$$

and variance $\sigma^2 t$.

Default occurs if the assets of the company fall short of its liabilities at the point in time t. The probability of failure (PD) is therefore given by the following expressions:

$$PD =$$

$$P(V_t < X_t) = P(\log V_t < \log X_t) = P\left(\log V_0 + \left(\mu - \frac{\sigma^2}{2}\right)t + \sigma B_t < \log X_t\right) =$$

$$P\left(\frac{\log \frac{V_0}{X_t} + \left(\mu - \frac{\sigma^2}{2}\right)t}{\sigma \sqrt{t}} < -\varepsilon\right) = \Phi\left(-\frac{\log \frac{V_0}{X_t} + \left(\mu - \frac{\sigma^2}{2}\right)t}{\sigma \sqrt{t}}\right) = \Phi(-d_2)$$

in which $\Phi$ is the distribution function of the standard normal distribution and d is defined using the Black Scholes option price model.

The expected recovery rate in the event of default is now determined by the ratio between the assets and liabilities V/X at the point in time t. If default occurs, i.e. $V_t < X_t$ the expected recovery rate will be $$RR = E\left(\frac{V_t}{X_t} \mid V_t < X_t\right) = \frac{V_t}{X_t} e^{\mu t} \frac{\Phi(-d_1)}{\Phi(-d_2)} = E\left(\frac{V_t}{X_t}\right) \frac{\Phi(-d_1)}{\Phi(-d_2)}$$

in so far as d is likewise defined by analogy with the Black Scholes model:

$$d_1 = \Phi\left(-\frac{\log \frac{V_0}{X_t} + \left(\mu + \frac{\sigma^2}{2}\right)t}{\sigma \sqrt{t}}\right)$$

The expected recovery rate in the event of default can therefore be written as:

$$RR = E\left(\frac{V_t}{X_t}\right) \frac{\Phi(-d_1)}{PD}$$

However, in this case the default is modelled in such a way that it is only possible at the end of the maturity period. Therefore, further parameters must be introduced to take account of the fact that a failure or default occurs when the assets reach a lower limit value. As a result, the recovery rates can be defined as exogenous parameters without reference to the asset value of the company.

The estimate of the non-observable asset values of the company is not very easy nor is its volatility which represents the main problem in all company value models. Frequently therefore implementation of these models is very difficult in the case of companies which are not traded on the stock market. To avoid this problem, the determination can be further refined using what are known as Reduced Form Models.

In the Reduced Form Models, the defaults follow a stochastic intensity process so that, depending on the timing, a particular probability of an unforeseeable default occurs. The default probability and recovery rate vary stochastically as a function of time. The Reduced Form Models are not based on the value of the company so which therefore does not have to be explicitly estimated. The failure of a company tends to be regarded rather as an "unpredictable" and "sudden" event. The probability of default and the recovery rate are modelled here as a function of a creditworthiness assessment or a rating. In general, an exogenous Recovery Rate which is not dependent on the probability of default is assumed to exist.

The assets of every company and hence also the Recovery Rate may be assumed to be dependent on the systematic risk factor X. If the values of X are small the default rate rises above their average value, while the Recovery Rate falls below that value. Every company is now also dependent on another company-specific non-systematic factor X. The value of the firm Aj of a particular business can therefore be written as follows:

$$A_j = pX + \sqrt{1-p^2} \cdot X_j$$

where X and $X_j$ have a standard normal distribution and Aj N(0,1)- is likewise distributed. The parameter p shows the sensitivity of the asset value to the systematic risk factor.

In this model world, default of a company occurs if the asset level falls below a threshold value. Let D be the default of company j and PD its probability; in that case $$D_j = \begin{cases} 1, & \text{if } A_j \leq \Phi^{-1}(PD_j) \\ 0, & \text{otherwise} \end{cases}$$

In the case of a large diversified portfolio based on the rigid law of large numbers with a fixed realization x of the systematic risk factor X, the following expression applies to the conditional default probability of a business $DF_j$:

$$DF_j = P(A_j < \Phi^{-1}(PD_j) \mid X = x) =$$
$$= P(px + \sqrt{1-p^2} X_j \leq \Phi^{-1}(PD_j))$$
$$= \Phi\left(\frac{\Phi^{-1}(PD_j) - px}{\sqrt{1-p^2}}\right)$$

Manifestly, small or negative values of X lead to an increase in corporate default. As to the Recovery Rate of a business j, this also depends on the systematic risk factor X and on a non-systematic factor $Z_j$:

$$RR_j = \mu_j + \sigma qX + \sigma\sqrt{1-q^2} \cdot Z_j$$

$Z_j$ follows the standard normal distribution and is independent of X. Therefore $RR_j$ is also in a standard distribution with a mean value $\mu$ and a variance $\sigma^2$. Once again q is a sensitivity factor and the following expression therefore applies to the corporate value of firm $A_j$ or the Recovery Rate $RR_j$:

$$\text{corr}(A_j, R) = p \text{ and corr}(RR_j, X) = q.$$

The monitoring unit 20 likewise comprises a MonteCarlo module 202 to generate MonteCarlo parameters for each company. This MonteCarlo module 202 can be used to determine companies in which the corresponding recovery rate factors can be expected. Based on the determinate recovery rate factors and the threshold value chosen in each case, companies can therefore be determined with a particularly positive or particularly negative influence on the portfolio which is to be managed.

The monitoring unit 20 additionally comprises output elements 21 to display companies with the expected recovery rate factors via an output and/or for dynamic adjustment in the portfolio. Here financial data are transferred via the communication network 51 to at least one financial institution 60, 61 and 63. The output elements 21 may, in particular, comprise optical output elements such as computer monitors, television screens or other displays etc. but also acoustic output elements such as loudspeakers etc. Additionally the output elements 21 may comprise physical interfaces to permit the transmission of data, in particular financial data via the communication network 51. By means of the output elements 21 direct and dynamic adjustments can likewise be made to the portfolio. Based on the specified recovery rate factors and MonteCarlo asset parameters, the securities to be bought and sold can be determined and the corresponding transactions performed dynamically in real time by means of the output elements 21.

The monitoring unit 20 may likewise comprise a database 211 on which the smallest expected recovery rate factors can be stored in a manner associated with the portfolio. Via the communication network 51, users can then gain controlled access to the recovery rate factors on database 211 and adjust the corresponding portfolio. For access control purposes any existing or innovative techniques and methods can be used in particular RADIUS and/or other similar identification and access control methods.

In FIG. 1, the reference numbers 521 or 522 denote receiver devices. Mobile communication devices are particularly suitable for the implementation of the method in accordance with the invention. Mobile communication devices 521/522 denote, in particular, all possible Customer Premises Equipment (CPE) comprising, for example, all IP capable devices such as mobile telephones, PDAs or laptops. The receiver devices 521/522 may, however, also be devices produced specially for the purposes of this invention. Moreover, receiver devices 521/522 may also be implemented as software components of a personal computer (PC). In particular, the receiver devices 521/522 are equipped with a physical interface by means of which programs distributed by the broadcast provider 52 and/or data can be received via broadcast channels for example via the broadcast cable network or via a broadcast receiving antenna as radio waves via an aerial interface. Broadcasting systems with such broadcast transmitters and broadcast receivers include, for example, digital audio broadcasting (DAB) and digital video broadcasting (DVB).

The broadcast transmitter 52 can distribute programs and/or data on one or more channels which can be received by the receiving devices 521/522. Here the receiving devices 521/522 may, for example, simultaneously receive more than one DB channel by means of suitable receiving facilities. These programs and/or data may, in particular, comprise portfolio data which are determined by means of the monitoring unit 20 and transmitted via the communication network 51 to the broadcast transmitter 52. The portfolio data may, for example, comprise the lowest expected recovery rate factors corresponding to companies in a portfolio. To receive relevant portfolio management data, the receiver devices 521/522 may, in particular, also include configurable filter systems by means of which relevant portfolio data can be extracted from the DB data stream for a specific portfolio. By means of configurable filter facilities in the receiver devices 521/522, portfolio data relevant to a particular portfolio can likewise be displayed and/or stored. The receiver devices 521522 can likewise be used to buy or sell securities directly via a financial institution 60, 61 and 63 on the basis of the portfolio management data.

The receiver devices 521/522 may likewise have one or more further physical network interfaces which can also support more than one different network standard. These physical network interfaces may, for example, be interfaces with local wireless networks, in particular WLAN (Wireless Local Area Network) 802.11, Bluetooth and/or GSM (Global System for Mobile Communication), GPRS (Generalized Packet Radio Service), USSD (Unstructured Supplementary Services Data), WCDMA (Wideband Code Division Multiple Access), UMTS (Universal Mobile Telecommunications System) and also Ethernet, Token Ring and/or other Wired LAN (Local Area Networks) and hence the Internet and WWW (World Wide Web). The reference number 51 in FIG. 1 therefore denotes the different physical networks. The basic principle is that the method and/or system in accordance with the invention is not tied to a specific network standard in so far as the characteristics in accordance with the invention are present, but can be implemented with one or more desired networks, in particular also because the receiving devices 521/522, for example mobile communication appliances, switch transparently between the different networks. In that regard, the mobile communication appliances 521/522 can, in particular, support the specifications of the standards for seamless changeover from voice and data carrier services such as UMA (Unlicensed Mobile Access) for seamless transition between WLAN, GSM/GPRS or Bluetooth, SCCAN (Seamless Converged Communication Across Networks) or Bluephone.

In addition, the receiver devices 521/522 can include means of receiving access-controlled portfolio data so that, by means of the receiver devices 521/522, access request data can be transmitted and corresponding access authorization data received. By means of the received access authorization data, the access-controlled portfolio data can be decoded. The encryption of the portfolio data can be based upon all known or innovative encryption procedures and techniques. In FIG. 1, the reference 511 is to a conditional access server. This conditional access server 511 can include the authorization data of the individual users and, based, in particular, upon received access request data from mobile communication devices 521/522, give user authorization. All current or innovative authorization procedures and methods can be used for this purpose.

In FIG. 1, the reference 512 is to a transaction server for billing data received via the communication network 51 including information provided upon reception of the portfolio management data. The billing data can in particular be transferred via a mobile telephone network to the transaction server 512. All current or innovative billing methods or mechanisms can be used, in particular those which are associated with pre-paid cards or fixed user subscriptions. The receiver devices 521/522 can, in particular, include suitable cost acquisition modules by means of which the billing data can be transferred to a transaction server 512. This transfer can take place during and/or after access to the access-controlled portfolio management data on a regular or non-recurrent basis.

Attention is called to the fact that the use of the present invention is not confined to a risk monitoring system for the automated credit risk monitoring of a portfolio. The applications are particularly versatile and comprise all risk monitoring tasks in which specific recovery rate factors play a role.

We claim:

1. An automated monitoring and signaling device for automated adaption and real-time adjustment of monitored portfolios of entities based on automatically determined recovery rate factors and entity-specific MonteCarlo parameters comprising:

processing circuitry configured to, for each entity of a plurality of entities of a portfolio
extract one or more asset parameters of the entity, wherein entity-specific data, including control data of externally accessible entity data and of internally accessible entity data, is updated and transferred in real-time to the monitoring device via a communication network, the control data including one or more of a time since foundation of the entity, a number of employees of the entity, and a balance sheet of the entity, and wherein the one or more asset parameters of the entity are extracted from the control data for the entities concerned by the processing circuitry, determine stochastically and store, a corresponding entity-specific asset distribution by stochastically evaluating the one or more asset parameters, determine and standardize by a standardization factor of the processing circuitry a recovery rate factor in an event the entity defaults based on a particular entity-specific asset distribution, the recovery rate factor indicating an expected percentage share of a loan that will be recovered from the entity in an event of default on the loan by the entity, determine and store an associated threshold value based on the particular entity-specific asset distribution, wherein the associated threshold value corresponds, in each case, to an expected value of one or more asset parameters, wherein default by the entity occurs when an asset parameter of the entity falls below the threshold value time-dependently varying default probability and recovery rate stochastically whereby the occurring defaults follow a stochastic intensity process depending on timing, and probability comprises a probability for unforeseeable default occurrings, and wherein the recovery rate depends on a probability of default that is negatively correlated with the recovery rate, such that the recovery rate is decreased in response to a detected failure rate being above a predetermined threshold, perform a MonteCarlo simulation to identify one or more entities in the portfolio that have recovery rates above a predetermined probability threshold, wherein MonteCarlo parameters are generated for each entity to determine entities in which a corresponding recovery rate factor can be expected, and wherein based on the determined recovery rate factors and the threshold value chosen in each case a particular positive or particular negative risk influence of each entity on the portfolio is determined, and adjust directly, and dynamically in real-time, the portfolio based on the recovery rates and the threshold values for the one or more entities identified in the MonteCarlo simulation based on specified recovery rate factors and the MonteCarlo parameters by using receiver devices to transmit access-controlled portfolio management data via a physical interface to a connected transaction server for automated real-time adjustment of the monitored portfolios of entities, wherein the receiver devices comprise configurable filter facilities and simultaneously receive more than one DB channel, wherein the processing circuitry is further configured to identify and store, in a database, expected recovery rates that are determined to be a minimum value of the recovery rate expected by the MonteCarlo simulation, output, via a network interface of the device, the minimum value of the recovery rate to remote user devices, wherein the one or more asset parameters are extracted from control data used to assess a credit risk of the entity, and the processing circuitry is further configured to:

update the control data at regular intervals, and repeat performance of the MonteCarlo simulation and adjustment of the portfolio based on the updated control data.

2. The device according to claim 1, wherein the recovery rates for the entities of the portfolio are standardized distributions.

3. The device according to claim 1, wherein the processing circuitry is configured to adjust the portfolio by purchasing or selling securities of the one or more entities that are identified in the MonteCarlo simulation.

4. The device according to claim 1, wherein the control data further includes one or more of cash flow of the entity, and credit liabilities of the entity.

5. The device according to claim 1, wherein the processing circuitry is configured to adjust the portfolio based on the recovery rates and the threshold values for the one or more entities identified in the MonteCarlo simulation by outputting instruction signals to one or more receiving devices of a financial institution.

6. The device according to claim 1, wherein the threshold value corresponds to an expected value of the one or more asset parameters in an occurrence of insolvency of the entity.

7. The device according to claim 1, wherein the processing circuitry is configured to display the expected recovery rates for the entities represented in the portfolio.

8. An automated monitoring and signaling method for automated adaption and real-time adjustment of monitored portfolios of entities based on automatically determined recovery rate factors and entity-specific MonteCarlo parameters, the method comprising:

for each entity of a plurality of entities of a portfolio
extracting one or more asset parameters of the entity, wherein entity-specific data comprises control data of externally accessible entity data and internally accessible entity data are updated and transferred in real-time to the monitoring device via a communication network, the control data including one or more of a time since foundation of the entity, a number of employees of the entity, and a balance sheet of the entity, and the one or more asset parameters of the entity are extracted from the control data for the entities concerned,
determining stochastically and storing, a corresponding entity-specific asset distribution by stochastically evaluating the one or more asset parameters,
determining and standardizing by a standardization factor, a recovery rate factor in an event the entity defaults based on a particular entity-specific asset distribution, the recovery rate factor indicating an expected percentage share of a loan that will be recovered from the entity in an event of default on the loan by the entity,
determining and storing an associated threshold value based on the particular entity-specific asset distribution, wherein the associated threshold value corresponds, in each case, to an expected value of one or more asset parameters, wherein default by the entity occurs when an asset parameter of the entity falls below the threshold value time-dependently varying default probability and recovery rate stochastically whereby the occurring defaults follow a stochastic intensity process depending on timing, and probability comprises a probability for unforeseeable default occurrings, and wherein the recovery rate depends on a probability of default that is negatively correlated with the recovery rate, such that the recovery rate is decreased in response to a detected failure rate being above a predetermined threshold,
performing, by a computer, a MonteCarlo simulation to identify one or more entities in the portfolio that have recovery rates above a predetermined probability threshold, wherein MonteCarlo parameters are generated for each entity to determine entities in which a corresponding recovery rate factor can be expected, and wherein based on the determined recovery rate factors and the threshold value chosen in each case a particular positive or particular negative risk influence of each entity on the portfolio is determined,
adjusting directly, and dynamically in real-time, the portfolio based on the recovery rates and the threshold values for the one or more entities identified in the MonteCarlo simulation based on specified recovery rate factors and the MonteCarlo parameters by using receiver devices to transmit access-controlled portfolio management data via a physical interface to a connected transaction server for automated real-time adjustment of the monitored portfolios of entities, wherein the receiver devices comprise configurable filter facilities and simultaneously receive more than one DB channel,
identifying and storing, in a database, expected recovery rates that are determined to be a minimum value of the recovery rate expected by the MonteCarlo simulation,
outputting, via a network interface of the device, the minimum value of the recovery rate to remote user devices, wherein the one or more asset parameters are extracted from control data used to assess a credit risk of the entity,
updating the control data at regular intervals, and
repeating performance of the MonteCarlo simulation and adjustment of the portfolio based on the updated control data.

9. A non-transitory computer readable medium including executable instructions, which when executed by a processor, cause the processor to perform an automated monitoring and signaling method for automated adaption and real-time adjustment of monitored portfolios of entities based on automatically determined recovery rate factors and entity-specific MonteCarlo parameters, the method comprising:

for each entity of a plurality of entities of a portfolio
extracting one or more asset parameters of the entity, wherein entity-specific data comprises control data of externally accessible entity data and internally accessible entity data are updated and transferred in real-time to the monitoring device via a communication network, the control data including one or more of a time since foundation of the entity, a number of employees of the entity, and a balance sheet of the entity, and the one or more asset parameters of the entity are extracted from the control data for the entities concerned,
determining stochastically and storing, a corresponding entity-specific asset distribution by stochastically evaluating the one or more asset parameters,
determining and standardizing by a standardization factor, a recovery rate factor in an event the entity defaults based on a particular entity-specific asset distribution, the recovery rate factor indicating an expected percentage share of a loan that will be recovered from the entity in an event of default on the loan by the entity,
determining and storing an associated threshold value based on the particular entity-specific asset distribution, wherein the associated threshold value corresponds, in each case, to an expected value of one or more asset parameters, wherein default by the entity occurs when an asset parameter of the entity falls below the threshold value time-dependently varying default probability and recovery rate stochastically whereby the occurring defaults follow a stochastic intensity process depending on timing, and probability comprises a probability for unforeseeable default occurrings, and wherein the recovery rate depends on a probability of default that is negatively correlated with the recovery rate, such that the recovery rate is decreased in response to a detected failure rate being above a predetermined threshold, performing, by a computer, a MonteCarlo simulation to identify one or more entities in the portfolio that have recovery rates above a predetermined probability threshold, wherein MonteCarlo parameters are generated for each entity to determine entities in which a corresponding recovery rate factor can be expected, and wherein based on the determined recovery rate factors and the threshold value chosen in each case a particular positive or particular negative risk influence of each entity on the portfolio is determined, adjusting directly, and dynamically in real-time, the portfolio based on the recovery rates and the threshold values for the one or more entities identified in the MonteCarlo simulation based on specified recovery rate factors and the MonteCarlo parameters by using receiver devices to transmit access-controlled portfolio management data via a physical interface to a connected transaction server for automated real-time adjustment of the monitored portfolios of entities, wherein the receiver devices comprise configurable filter facilities and simultaneously receive more than one DB channel, identifying and storing, in a database, expected recovery rates that are determined to be a minimum value of the recovery rate expected by the MonteCarlo simulation, outputting, via a network interface of the device, the minimum value of the recovery rate to remote user devices, wherein the one or more asset parameters are extracted from control data used to assess a credit risk of the entity, updating the control data at regular intervals, and repeating performance of the MonteCarlo simulation and adjustment of the portfolio based on the updated control data.

* * * * *